United States Patent
Kurogome et al.

(10) Patent No.: US 12,282,550 B2
(45) Date of Patent: Apr. 22, 2025

(54) RULE GENERATING DEVICE AND RULE GENERATING PROGRAM

(71) Applicant: NIPPON TELEGRAPH AND TELEPHONE CORPORATION, Tokyo (JP)

(72) Inventors: Yuma Kurogome, Musashino (JP); Yuhei Kawakoya, Musashino (JP); Makoto Iwamura, Musashino (JP); Yuto Otsuki, Musashino (JP); Jun Miyoshi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 226 days.

(21) Appl. No.: 17/774,478

(22) PCT Filed: Nov. 28, 2019

(86) PCT No.: PCT/JP2019/046682
§ 371 (c)(1),
(2) Date: May 5, 2022

(87) PCT Pub. No.: WO2021/106172
PCT Pub. Date: Jun. 3, 2021

(65) Prior Publication Data
US 2022/0391505 A1 Dec. 8, 2022

(51) Int. Cl.
*G06F 21/56* (2013.01)
(52) U.S. Cl.
CPC ........ *G06F 21/56* (2013.01); *G06F 2221/034* (2013.01)

(58) Field of Classification Search
CPC ............................ G06F 21/56; G06F 2221/034
See application file for complete search history.

(56) References Cited

U.S. PATENT DOCUMENTS

| 2012/0304244 A1* | 11/2012 | Xie ..................... H04L 63/1425 |
| | | 726/1 |
| 2015/0101049 A1* | 4/2015 | Lukacs ................... H04L 63/14 |
| | | 726/23 |

(Continued)

FOREIGN PATENT DOCUMENTS

| JP | 2005-258497 A | 9/2005 |
| WO | 2015/114804 A1 | 8/2015 |

OTHER PUBLICATIONS

Perdisci et al., "Behavioral Clustering of HTTP-Based Malware and Signature Generation Using Malicious Network Traces", In Proceedings of the 7th USENIX Conference on Networked Systems Design and Implementation (NSDI' 10), 2010, pp. 1-14.

(Continued)

*Primary Examiner* — Raqiul A Choudhury
(74) *Attorney, Agent, or Firm* — XSENSUS LLP (57) ABSTRACT

A rule generation apparatus includes processing circuitry configured to enumerate rule candidates with different degrees of abstraction as candidates for a rule for detecting a malware trace using an analysis result of malware, and calculate evaluation values of the rule candidates enumerated using a predetermined evaluation function and sort a rule from among the rule candidates based on the evaluation values.

14 Claims, 9 Drawing Sheets

(56) References Cited

U.S. PATENT DOCUMENTS

| | | | | |
|---|---|---|---|---|
| 2015/0121450 A1* | 4/2015 | Chen | ............... | H04L 63/0227 |
| | | | | 726/1 |
| 2015/0269383 A1* | 9/2015 | Lang | ............... | G06F 21/57 |
| | | | | 726/1 |
| 2016/0072836 A1* | 3/2016 | Hadden | ............... | H04L 63/1416 |
| | | | | 726/23 |
| 2017/0013018 A1* | 1/2017 | Nakata | ............... | H04L 12/6418 |
| 2017/0222878 A1* | 8/2017 | Jacquin | ............... | H04L 41/0895 |
| 2018/0012021 A1* | 1/2018 | Volkov | ............... | H04L 63/1416 |
| 2018/0046800 A1* | 2/2018 | Aoki | ............... | G06F 21/56 |
| 2020/0314120 A1* | 10/2020 | Dedenok | ............... | H04L 51/18 |

OTHER PUBLICATIONS

Ross et al., "mandiant/OpenIOC_1.1", Available Online At: https://github.com/mandiant/OpenIOC_1.1, GitHub, Retrieved from Internet on Nov. 20, 2019, pp. 1-3.

"Attack Collection/Analysis and IOC Auto-Generation Technology for Total Active Defence Service", Business Communication, vol. 56, No. 4, Apr. 1, 2019, pp. 62-64. (with English Translation).

International Search Report and Written Opinion mailed on Feb. 4, 2020, received for PCT Application PCT/JP2019/046682, Filed on Nov. 28, 2019, 10 pages including English Translation.

* cited by examiner

RULE GENERATING DEVICE AND RULE GENERATING PROGRAM

CROSS-REFERENCE TO RELATED APPLICATION

The present application is based on PCT filing PCT/JP2019/046682, filed Nov. 28, 2019, the entire contents of which are incorporated herein by reference.

TECHNICAL FIELD

The present invention relates to a rule generation apparatus and a rule generation program.

BACKGROUND ART

Endpoint detection and response (EDR) has been known since recent years as a service for detecting traces that malware has created on a terminal based on rules for detecting malware traces and providing results of analysis performed by a security analyst as feedback. In addition, indicators of compromise (IOCs) are known as such rules for detecting malware traces. In IOCs, malware traces, for example, file paths, registry keys, process arguments, communication destination host names, communication destination IP addresses, and the like created by the malware are described.

In addition, a method of automatically generating rules that represent communication content during execution of malware, which is called a network signature, is known in the related art. As an automatic rule generation method, for example, there is a method in which malware is executed and analyzed, obtained communication details are clustered, similar parts are contracted into regular expressions for each cluster, and a regular expression with few false positives are selected as a rule group based on a preset threshold.

CITATION LIST

Non Patent Literature

NPL 1: Roberto Perdisci, Wenke Lee, and Nick Feamster. 2010. "Behavioral Clustering of HTTP-based Malware and Signature Generation Using Malicious Network Traces" In Proceedings of the 7th USENIX Conference on Networked Systems Design and Implementation (NSDI '10). 26-26.

NPL 2: "mandiant/OpenIOC_1.1", [online], GitHub, [retrieved on Nov. 20, 2019], Internet <https://github.com/mandiant/OpenIOC_1.1>

SUMMARY OF THE INVENTION

Technical Problem

The method in the related art cannot generate a rule automatically for detecting a malware trace with high accuracy. For example, if the automatic rule generation method that is a network signature is applied to automated generation of IOCs, the generated rules contain only regular expressions with a single degree of abstraction, and thus a trace generated by a normal program or a user is used as a matching target, instead of a malware trace that is the original matching target, which may cause false positives.

Means for Solving the Problem

In order to solve the problems described above and achieve an objective, a rule generation apparatus of the present invention includes: processing circuitry configured to: enumerate rule candidates with different degrees of abstraction as candidates for a rule for detecting a malware trace using an analysis result of malware, and calculate evaluation values of the rule candidates enumerated using a predetermined evaluation function and sorts a rule from among the rule candidates based on the evaluation values.

Effects of the Invention

According to the present invention, the effect of automatically generating a rule for detecting a malware trace with high accuracy is exhibited.

DESCRIPTION OF EMBODIMENTS

An embodiment of a rule generation apparatus and a rule generation program according to the present application will be described in detail with reference to the drawings. Further, the rule generation apparatus and the rule generation program according to the present application are not limited to the embodiment.

First Embodiment

In the following embodiment, a configuration and order of processing of a rule generation apparatus 10 according to a first embodiment will be described in order, and the effects of the first embodiment will be finally described.

Configuration of Rule Generation Apparatus

Figure 1:
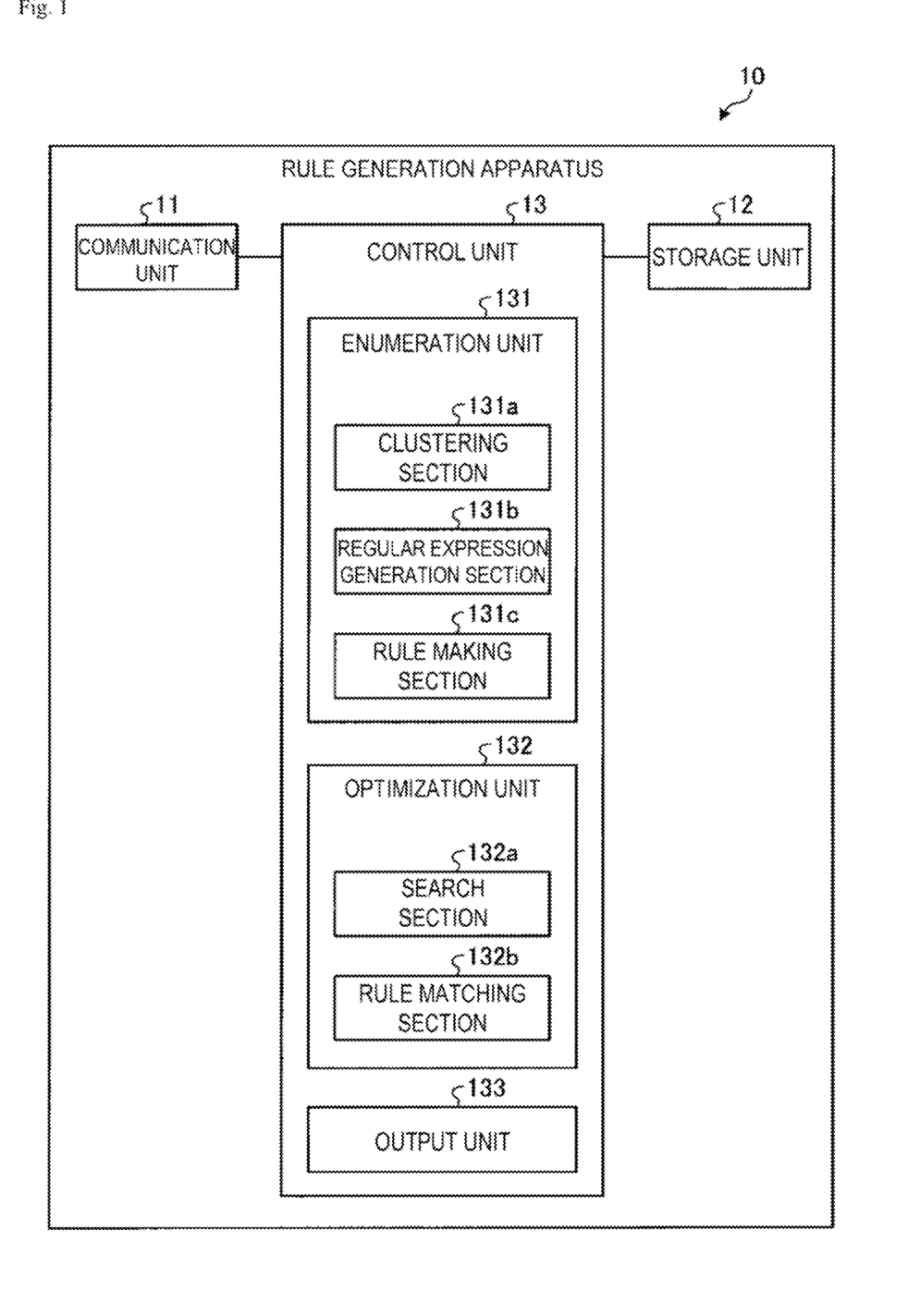
FIG. 1 is a diagram illustrating an example of a configuration of a rule generation apparatus according to a first embodiment.

First, a configuration of the rule generation apparatus 10 will be described with reference to FIG. 1. FIG. 1 is a diagram illustrating an example of a configuration of the rule generation apparatus according to the first embodiment. The rule generation apparatus 10 is an apparatus that automatically generates a rule for detecting a malware trace from analysis results of malware.

The rule generation apparatus 10 includes a communication unit 11, a storage unit 12, and a control unit 13 as illustrated in FIG. 1. Each unit will be described below.

The communication unit 11 is a communication interface on which various types of information are transmitted and/or received to and/or from another apparatus connected via a network or the like. The communication unit 11 is realized by a network interface card (NIC) or the like and enables the control unit 14 to communicate with another apparatus via an electrical communication line such as a local area network (LAN) or the Internet.

The storage unit 12 is realized by a semiconductor memory element such as a random access memory (RAM) or a flash memory, or a storage device such as a hard disk or an optical disc, and stores a processing program for causing the rule generation apparatus 10 to operate, data used during execution of the processing program, and the like.

The control unit 13 includes an internal memory for storing programs that define various processing procedures or the like and required data, and executes various types of processing using the programs and the data. For example, the control unit 13 is an electronic circuit such as a central processing unit (CPU) or a micro processing unit (MPU). The control unit 13 includes an enumeration unit 131, an optimization unit 132, and an output unit 133.

The enumeration unit 131 enumerates rule candidates with different degrees of abstraction as candidates for a rule for detecting a malware trace using analysis results of the malware. For example, the enumeration unit 131 divides malware traces included in the analysis results of the malware into clusters based on a degree of similarity of the malware traces and generates regular expressions of the rule candidates with any one or more of degrees of abstraction of three degrees including low, intermediate, and high degrees of abstraction for each cluster.

Figure 2:
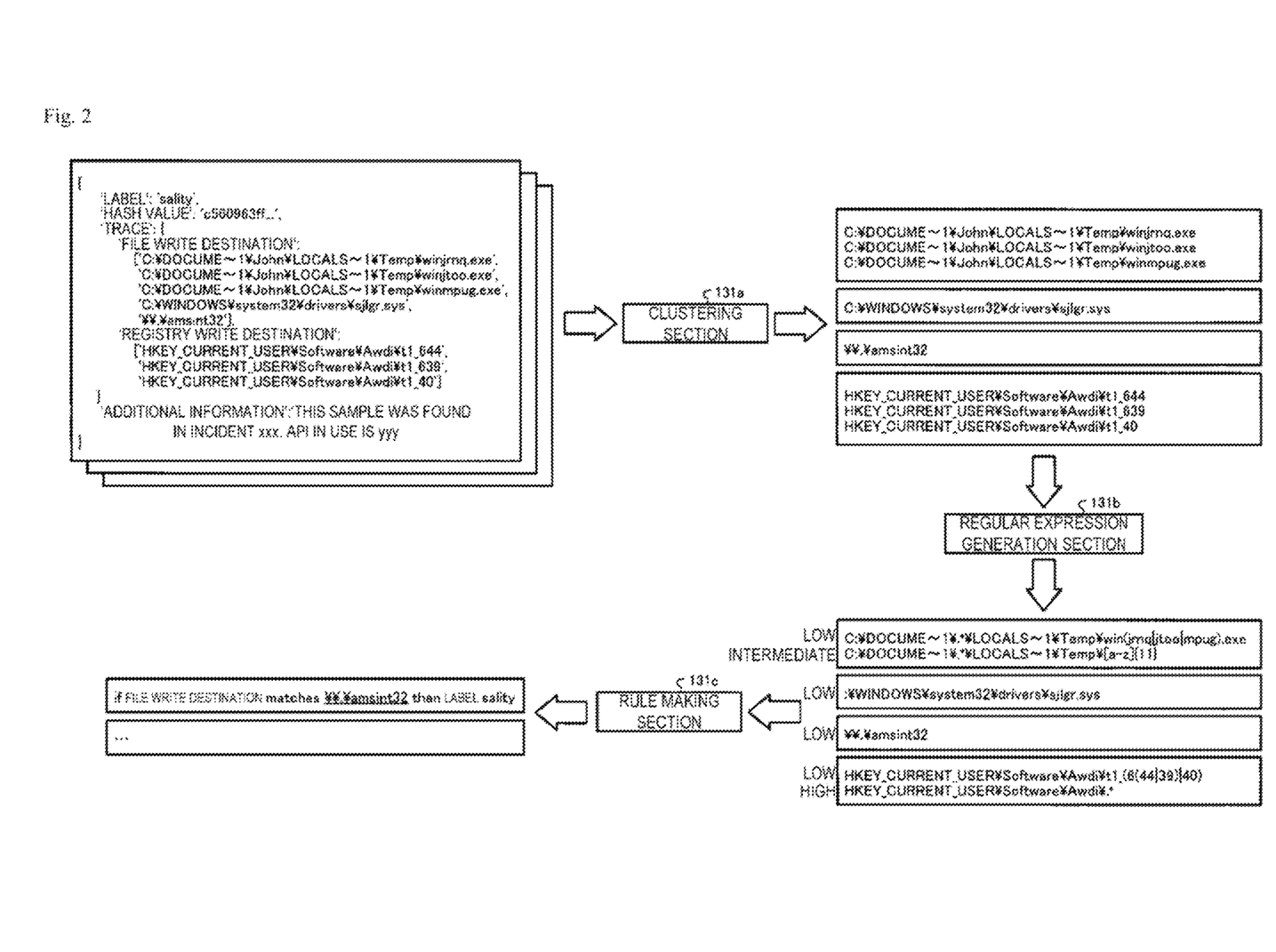
FIG. 2 is a diagram describing an overview of processing by an enumeration unit.

The enumeration unit 131 includes a clustering section 131a, a regular expression generation section 131b, and a rule making section 131c. Here, an overview of processing by the enumeration unit 131 will be described with reference to FIG. 2. FIG. 2 is a diagram describing an overview of processing by the enumeration unit. First, the enumeration unit 131 acquires a malware sample analysis result group as an analysis result of malware as illustrated in FIG. 2.

The malware sample analysis result group includes a label, a hash value, traces, and additional information for each sample. In addition, the traces may include any items allowed by the specifications of IOCs, such as the file write destinations, registry write destinations, process arguments, communication destinations, and the like. Furthermore, in the malware sample analysis result group, items that are not accepted based on the specification, other description, and the like may be described as additional information. Further, the enumeration unit 131 may acquire the malware sample analysis result group from an external analysis device, or may acquire the malware sample analysis result group from the storage unit 12 when the malware sample analysis result group is stored in the storage unit 12 in advance.

The clustering section 131a performs clustering on trace list for each label of malware and divides similar traces into clusters. For example, the clustering section 131a may calculate degrees of similarity of traces based on degrees of similarity thereof as character strings, and divide them into a plurality of clusters based on the calculated degrees of similarity.

Next, the regular expression generation section 131b generates a regular expression for each given cluster with each of low, medium, and high degree of abstraction. Then, the rule making section 131c matches each regular expression with the label of the malware detection analysis result group that is the generation source to make rules. The enumeration unit 131 enumerates the rules made by the rule making section 131c as rule candidates.

Figure 3:
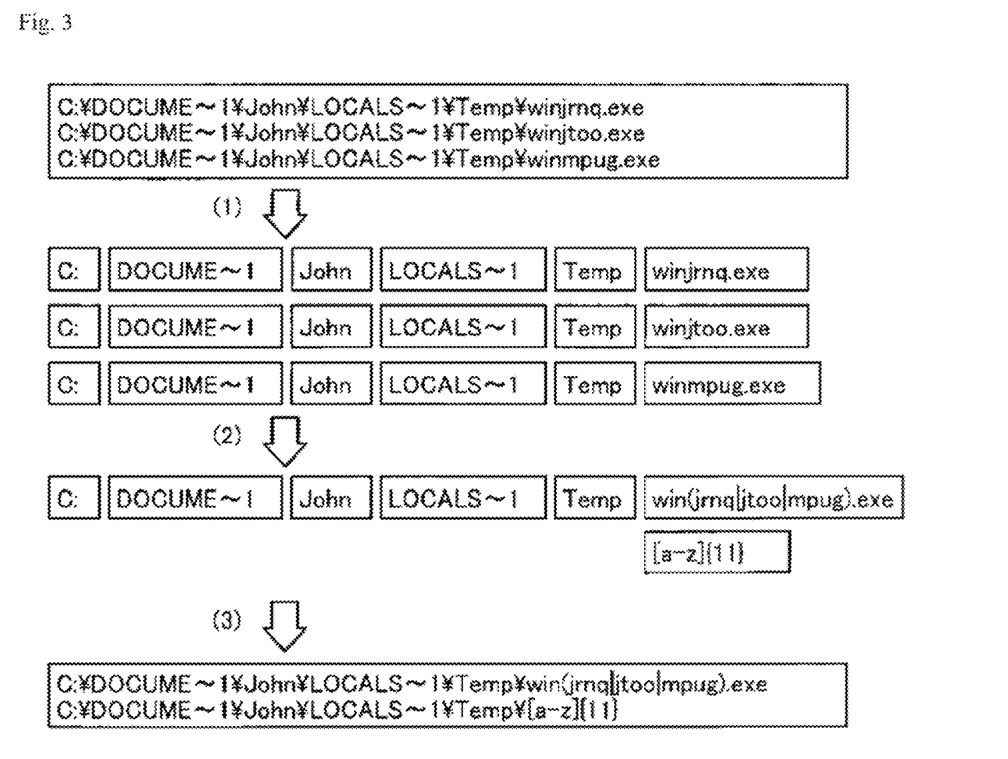
FIG. 3 is a diagram describing a detailed example of processing by a regular expression generation section.

Here, a detailed example of processing by the regular expression generation section 131b will be described with reference to FIG. 3. FIG. 3 is a diagram describing a detailed example of processing by the regular expression generation section. The regular expression generation section 131b divides the traces into layers for each given cluster as illustrated in FIG. 3 (see (1) of FIG. 3). For example, the regular expression generation section 131b divides the layers with "¥" when the traces are file paths.

Then, the regular expression generation section 131b prepares a set of regular expression candidates for each divided layer, and removes their redundant character strings if the character strings match exactly and adds their unique character strings to a candidate set. In addition, if character strings do not match exactly, the regular expression generation section 131b generates a regular expression with any one or more of low, intermediate, and high degrees of abstraction, and adds the regular expression to the candidate set (see (2) of FIG. 3).

For example, if a character string starts from a common partial string, for example, the regular expression generation section 131b generates a regular expression that starts from the common partial string and bonds a non-common partial string with an OR operator as a regular expression with the "low" degree of abstraction, and adds the regular expression the candidate set.

In addition, if character strings have the same length, for example, the regular expression generation section 131b generates, as a regular expression with the "intermediate" degree of abstraction, a regular expression indicating the character type and the character string length, and adds the regular expression to the candidate set. In addition, if the character strings do not have the same length, for example, the regular expression generation section 131b may generate a regular expression that matches any character string as a regular expression with the "high" degree of abstraction, and add the regular expression to the candidate set.

Then, the regular expression generation section 131b combines the elements of the candidate set of each layer (see (3) of FIG. 3). For example, the regular expression generation section 131b combines the elements as they are if the candidate set of the next layer includes one element. In addition, if the candidate set of the layer next to the layer including an element to be connected includes a plurality of elements, the regular expression generation section 131b adds the element to be connected itself to the candidate set of the layer including the element to be connected again, and then combines the next elements.

Figure 4:
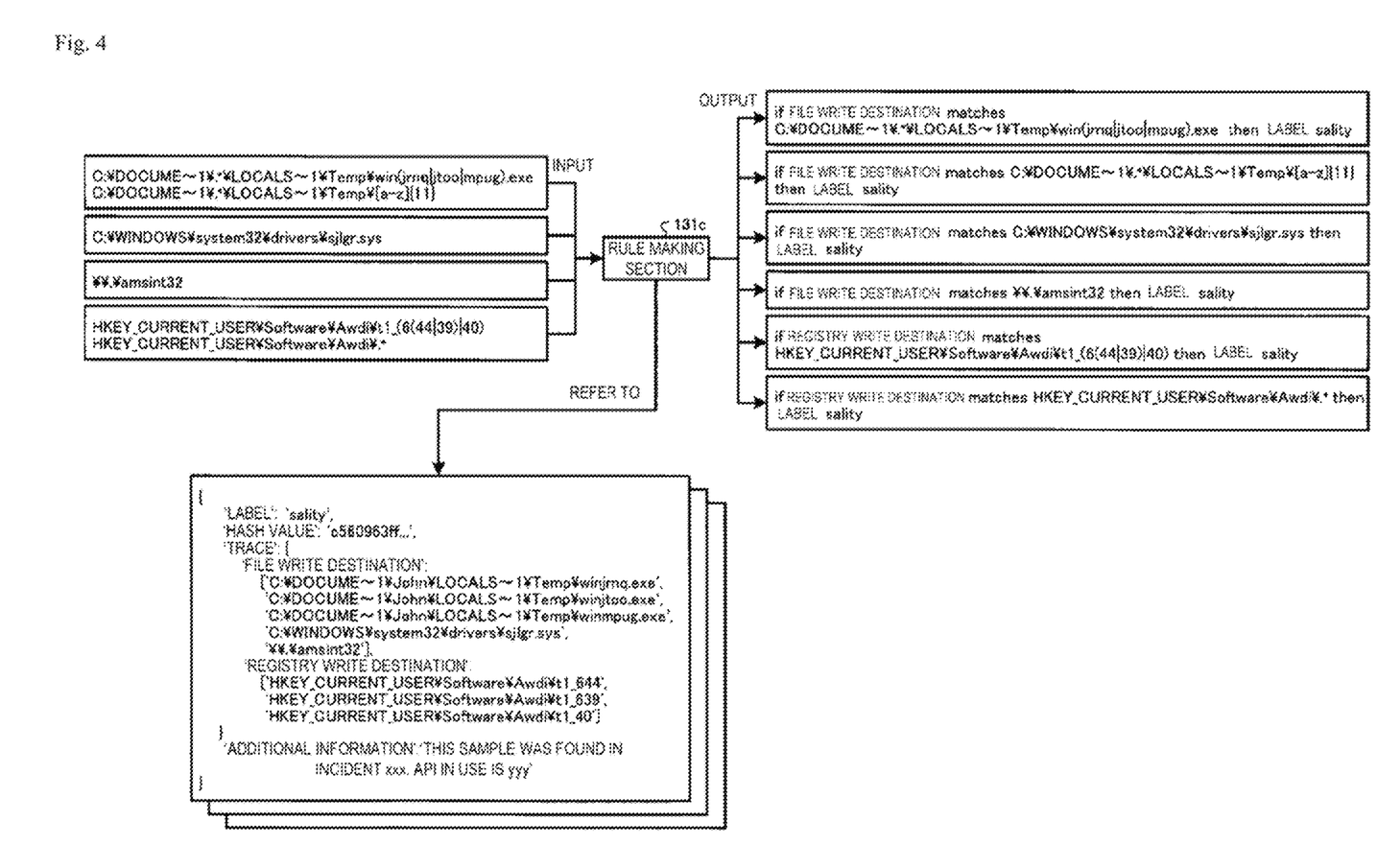
FIG. 4 is a diagram describing a detailed example of processing by a rule making section.

Next, a detailed example of processing by the rule making section 131c will be described using FIG. 4. FIG. 4 is a diagram describing a detailed example of processing by the rule making section. When the rule making section 131c receives the input of the regular expressions generated by the regular expression generation section 131b as inputs from the regular expression generation section 131b, the rule making section 131c refers to the malware sample analysis result group to find the label and type of trace of the malware sample analysis result group that the input regular expression matches as illustrated in FIG. 4. Then, the rule making section 131c uses the information of the matching label and the trace and outputs the input regular expression as a rule.

Returning to the description of FIG. 1, the optimization unit 132 calculates the evaluation values of the rule candidates enumerated by the enumeration unit 131 using the predetermined evaluation function, and sorts a rule from among the rule candidates based on the evaluation values. Further, although the evaluation function may be any function, the evaluation function is assumed to be a function capable of calculating the evaluation values based on, for example, at least one of a detection rate and a false positive rate. For example, the optimization unit 132 samples a subset from a set of rule candidates, refers to an analysis result for each subset, calculates an evaluation value based on any one or more of a detection rate, a false positive rate, the number of items of each rule candidate, a size of a rule set, and an overlapping rate of rules, and sorts a rule based on the evaluation values.

Figure 5:
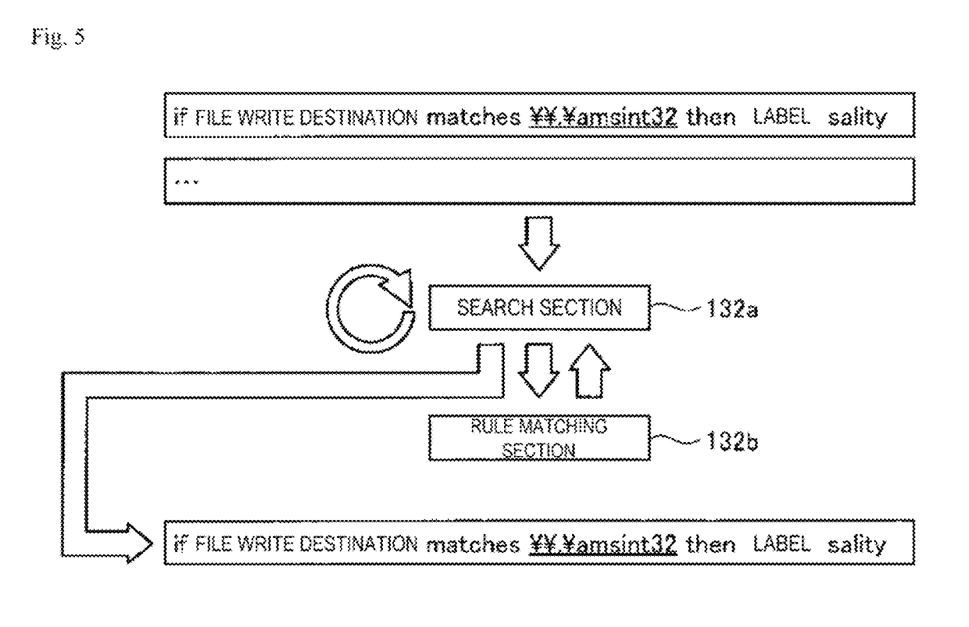
FIG. 5 is a diagram describing an overview of processing by an optimization unit.
Figure 6:
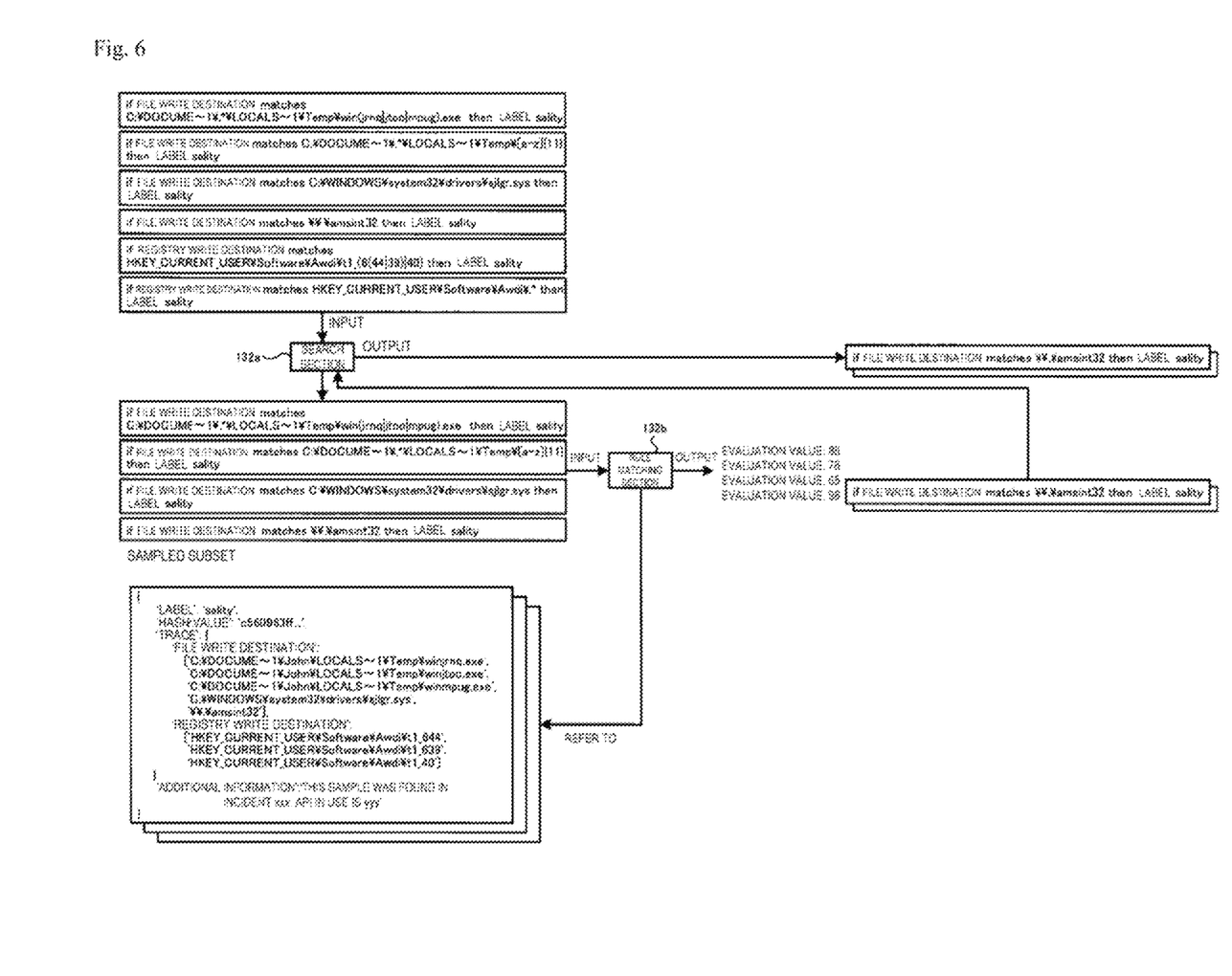
FIG. 6 is a diagram describing an overview of processing by the optimization unit.

The optimization unit 132 includes a search section 132*a* and a rule matching section 132*b*. Here, an overview of processing by the optimization unit 132 will be described using FIGS. 5 and 6. FIGS. 5 and 6 are diagrams describing an overview of processing by the optimization unit. The search section 132*a* initializes an evaluation value list upon receiving a set of rule candidates generated by the rule making section 131*c* as illustrated in FIGS. 5 and 6.

Then, the search section 132*a* samples a subset from the rule set, and inputs the subset into the rule matching section 132*b*. The rule matching section 132*b* calculates, for the input subset, an evaluation value of the subset based on a detection rate and a false positive rate for the malware sample analysis result group, the number of items of each rule, a size of the rule set, an overlapping rate of each rule, and the like, and inputs the evaluation values to the search section 132*a*. In other words, the search section 132*a* calculates an evaluation value with an evaluation function in which the evaluation value increases as the detection rate becomes higher and the false positive rate becomes lower. In addition, it is assumed that, as the number of items for each rule becomes smaller, the size of the rule set becomes smaller, and the overlapping rate of each rule becomes lower, the evaluation value becomes higher.

Upon receiving the evaluation value of the subset from the rule matching section 132*b*, the search section 132*a* adds the received evaluation value to the evaluation value list. Thereafter, the search section 132*a* samples a subset from the rule set and repeats the processing of inputting the subset to the rule matching section 132*b*. The rule matching section 132*b* calculates the evaluation value of the subset each time a subset is input. Further, the search section 132*a* may repeat the operation until subsets of all patterns are sampled from the set of rule candidates, or may repeat the operation until a predetermined condition is satisfied. Thereafter, the search section 132*a* outputs a rule included in the subset with the highest evaluation value in the evaluation value list to the output unit 133.

Figure 7:
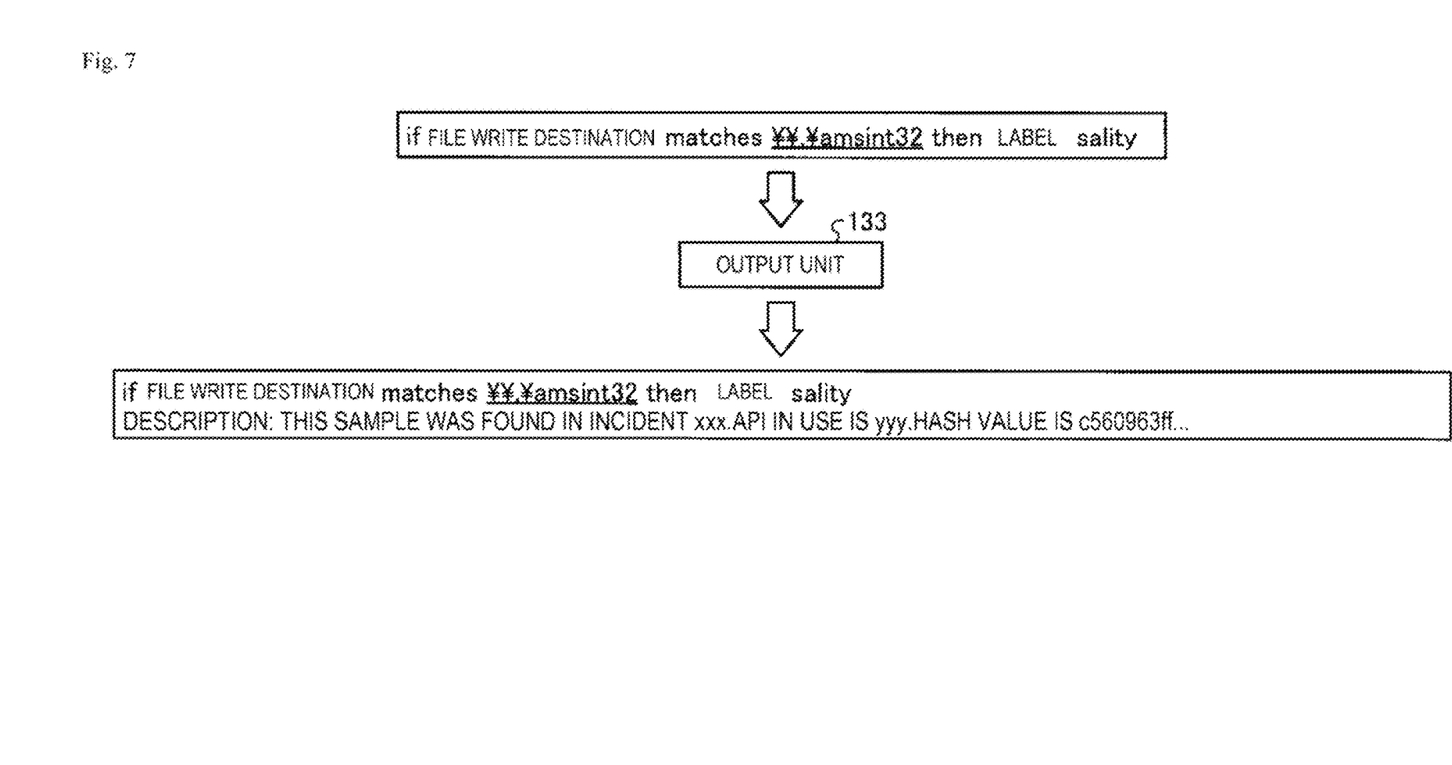
FIG. 7 is a diagram describing an overview of processing by an output unit.

Returning to the description of FIG. 1, the output unit 133 imparts the malware information included in the analysis result to the rule sorted by the optimization unit 132 and outputs the information. For example, the output unit 133 receives the rule input from the search section 132*a* described above, and imparts additional information and hash values included in the malware sample analysis result group to the rules as illustrated in FIG. 7. Moreover, the output unit 133 outputs a file in a format (e.g., xml, json, etc.) accepted by monitoring software using IOC. FIG. 7 is a diagram describing an overview of processing by the output unit.

Processing Procedure of Rule Generation Apparatus

Figure 8:
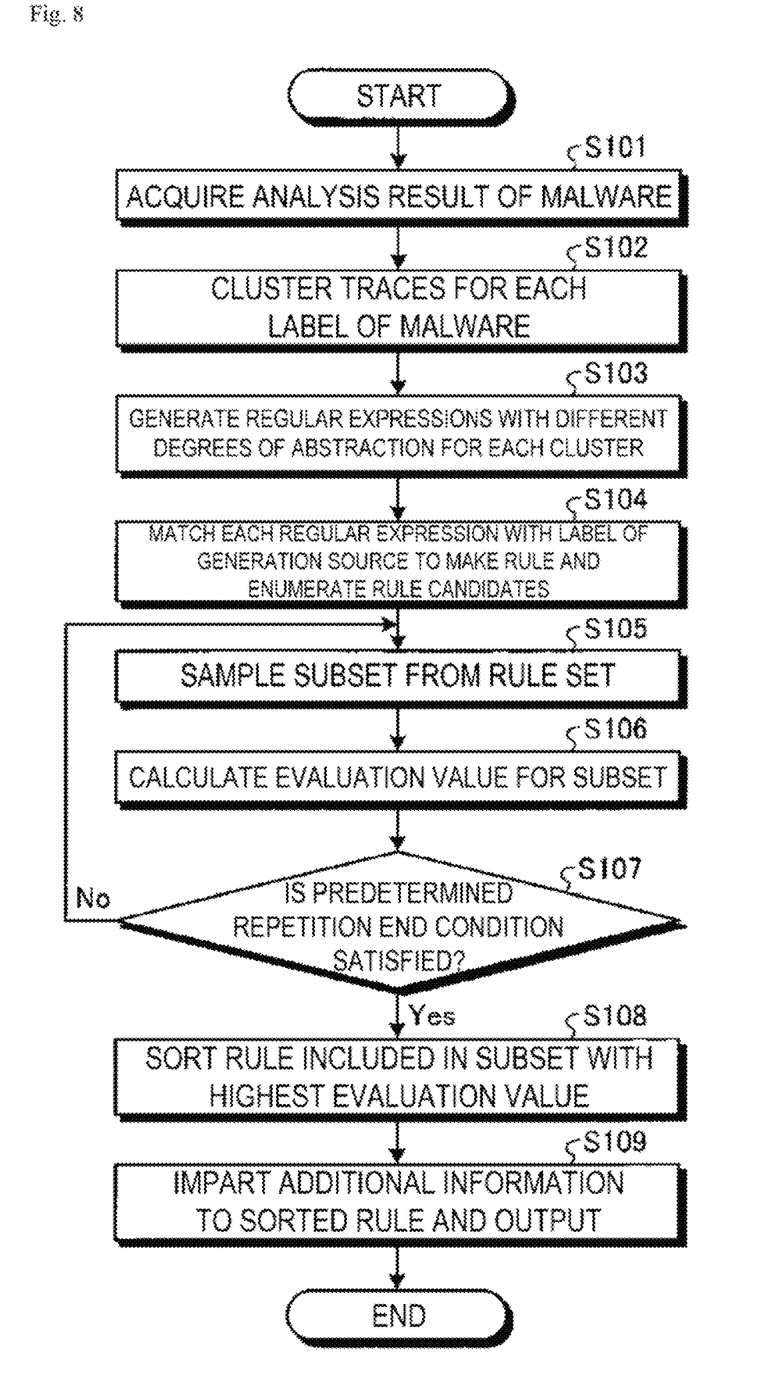
FIG. 8 is a flowchart showing an example of rule generation processing by the rule generation apparatus according to the first embodiment.
Figure 9:
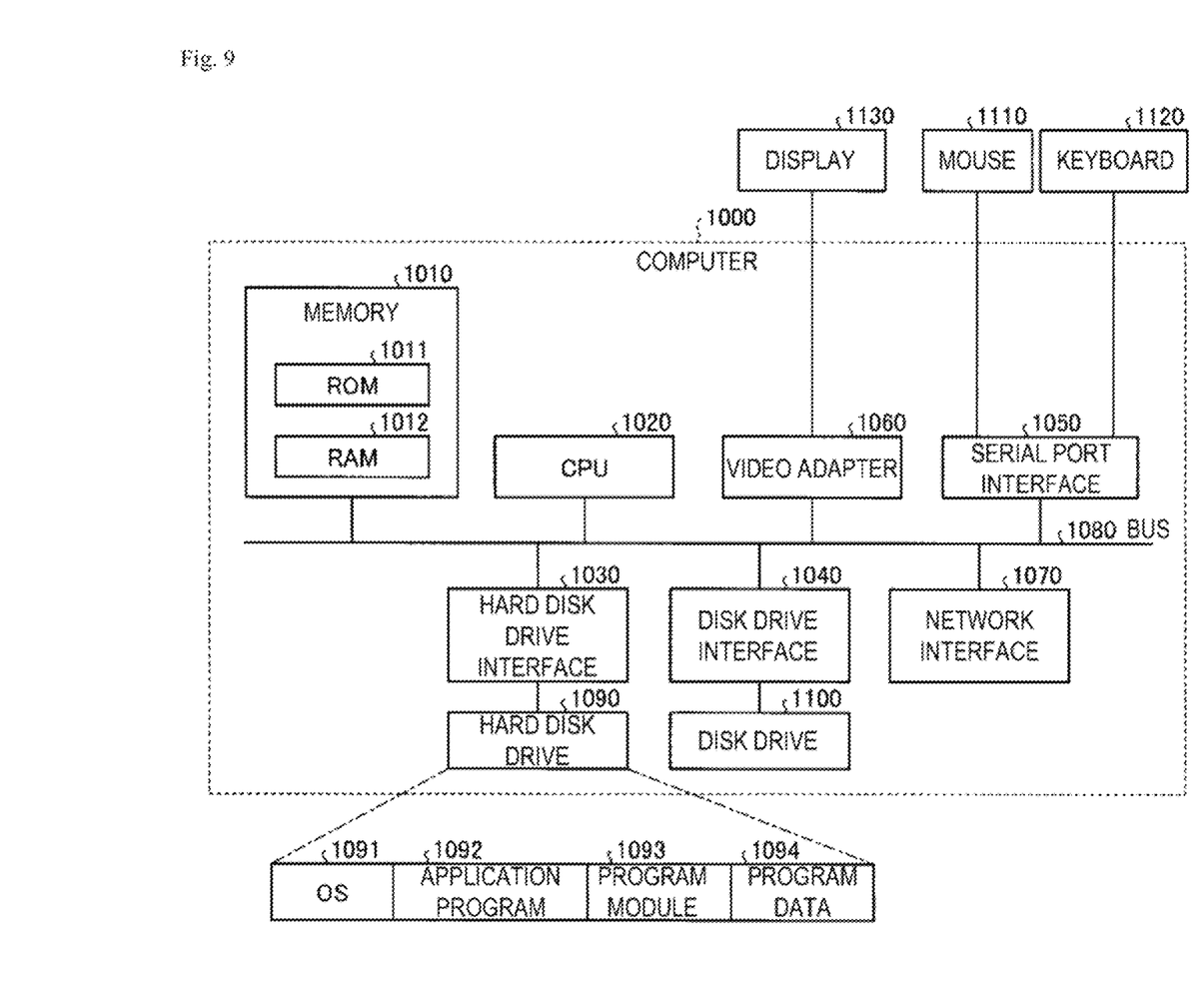
FIG. 9 is a diagram illustrating a computer that executes a rule generation program.

Next, an example of the procedure of the processing performed by the rule generation apparatus 10 according to the first embodiment will be described using FIG. 8. FIG. 8 is a flowchart showing an example of the rule generation processing by the rule generation apparatus according to the first embodiment.

The enumeration unit 131 of the rule generation apparatus 10 acquires a malware sample analysis result group as an analysis result of the malware (step S101) as shown in FIG. 8. Then, the enumeration unit 131 clusters trace lists for each label of the malware to divide similar traces into clusters (step S102).

Next, the enumeration unit 131 generates regular expressions with different degrees of abstraction for each of the clusters (step S103). Then, each of the regular expressions is matched with the label of the malware detection analysis result group that is the generation source to make rules and the rules are enumerated as rule candidates (step S104).

The optimization unit 132 samples a subset from the rule set (step S105) and calculates an evaluation value for the subset (step S106). Then, if the optimization unit 132 determines whether a predetermined repetition end condition has been satisfied (step S107) and it is determined that the condition is not satisfied (NO in step S107), the processing returns to step S105 for repetition.

In addition, if the predetermined repetition end condition is satisfied (YES in step S107), the optimization unit 132 sorts a rule included in the subset with the highest evaluation value (step S108). Then, the output unit 133 imparts additional information and the like to the sorted rule and outputs the rule (step S109).

Effects of First Embodiment

As described above, the rule generation apparatus 10 according to the first embodiment uses the malware analysis result to enumerate rule candidates with different degrees of abstraction as candidates for a rule for detecting a malware trace. Then, the rule generation apparatus 10 calculates the evaluation values of the enumerated rule candidates using the predetermined evaluation function and sorts a rule from among the rule candidates based on the evaluation values. Thus, the rule generation apparatus 10 is able to automatically generate a rule for detecting a malware trace with high accuracy.

In IOCs, expressions of traces caused by behaviors, rather than terminal behaviors themselves are required. Thus, in IOCs, regular expressions that represent traces created by malware in the form of few false positives need to be described. In addition, because IOCs are based on the assumption of use cases in which IOCs are read and written by security analyzers using them in the course of analysis, regular expressions and descriptions need to be described in an easy-to-understand format for users. In this manner, IOCs require rule groups with high accuracy and high interpretability.

In the rule generation apparatus 10 according to the first embodiment, rule candidates with different degrees of abstraction are enumerated as candidates for rules, evaluation values of the enumerated rule candidates are calculated using the predetermined evaluation function, and a rule is sorted from among the rule candidates based on the evaluation values. Thus, the rule generation apparatus 10 according to the first embodiment exhibits the effect of generating IOC groups with high accuracy and high interpretability. In addition, the rule generation apparatus 10 can generate an IOC group that is instantaneously available in EDR services.

System Configuration, Etc.

In addition, the illustrated constituent components of the devices are functionally conceptual and are not necessarily physically configured as illustrated in the drawings. That is, the specific aspects of distribution and integration of each device are not limited to those illustrated in the drawings, and all or some of the devices may be distributed or integrated functionally or physically in desired units depending on various kinds of loads, states of use, and the like. Further, all or some of the processing functions performed by the devices can be realized by a CPU and a program analyzed and executed by the CPU or realized as hardware with wired logic.

In addition, all or some of the processing operations described as being automatically performed among the processing operations described in the present embodiment may be performed manually, or all or some of the processing operations described as being manually performed may be performed automatically using a known method. Further, the processing procedures, the control procedures, the specific names, and information including various data and parameters described in the specification or shown in the drawings may be freely changed unless specified otherwise.

Program

FIG. 8 is a diagram illustrating a computer that executes a rule generation program. The computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program, for example, a basic input output system (BIOS). The hard disk drive interface 1030 is connected to a hard disk drive 1090. The disk drive interface 1040 is connected to a disk drive 1100. A removable storage medium, for example, a magnetic disk or an optical disc is inserted into the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. That is, a program defining each processing of the rule generation apparatus 10 is mounted as the program module 1093 in which computer executable codes are described. The program module 1093 is stored in, for example, the hard disk drive 1090. For example, the program module 1093 for executing the same processing as that performed by the functional configurations in the apparatus is stored in the hard disk drive 1090. Further, the hard disk drive 1090 may be replaced with a solid state drive (SSD).

In addition, data used for the processing of the above-described embodiment is stored as the program data 1094 in, for example, the memory 1010 or the hard disk drive 1090. In addition, the CPU 1020 reads out and executes the program module 1093 or the program data 1094 stored in the memory 1010 or the hard disk drive 1090, as necessary, in the RAM 1012.

Further, the program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in another computer connected via a network or a WAN. In addition, the program module 1093 and the program data 1094 may be read from another computer by the CPU 1020 via the network interface 1070.

REFERENCE SIGNS LIST

10 Rule generation apparatus
11 Communication unit
12 Storage unit
13 Control unit
131 Enumeration unit
131a Clustering section
131b Regular expression generation section
131c Rule making section
132 Optimization unit
132a Search section
132b Rule matching section
133 Output unit

The invention claimed is:

1. A rule generation apparatus comprising:
processing circuitry configured to:
  enumerate each of a plurality of rule candidates with different degrees of abstraction as candidates for a rule for detecting a malware trace using an analysis result of malware, the different degrees of abstraction include a lowest degree of abstraction, an intermediate degree of abstraction that is greater than the lowest degree of abstraction, and a highest degree of abstraction that is greater than the intermediate degree of abstraction;
  calculate evaluation values of the rule candidates enumerated using a predetermined evaluation function and sort a rule from among the rule candidates based on the evaluation values;
  impart information of the malware included in the analysis result to the rule sorted and output the information;
  divide malware traces included in the analysis result of the malware into a plurality of clusters based on a degree of similarity of the malware traces; and
  generate a regular expression of each of the plurality of rule candidates with the different degrees of abstraction for each of the plurality of clusters.

2. The rule generation apparatus according to claim 1, wherein the processing circuitry is further configured to sample a subset from a set of the plurality of rule candidates, refer to the analysis result for the subset, calculate an evaluation value based on any one or more of a detection rate, a false positive rate, a number of items of each of the rule candidates, a size of a rule set, and an overlapping rate of rules, and sort a rule based on the evaluation values.

3. A non-transitory computer-readable recording medium storing therein a rule generation program that causes computer to execute a process comprising:
  enumerating each of a plurality of rule candidates with different degrees of abstraction as candidates for a rule for detecting a malware trace using an analysis result of malware, the different degrees of abstraction include a lowest degree of abstraction, an intermediate degree of abstraction that is greater than the lowest degree of abstraction, and a highest degree of abstraction that is greater than the intermediate degree of abstraction;
  calculating evaluation values of the rule candidates enumerated in the enumerating of the rule candidates using a predetermined evaluation function and sorting a rule from among the rule candidates based on the evaluation values; and
  imparting information of the malware included in the analysis result to the rule sorted in the calculating of the evaluation values and the sorting of the rule, and outputting the information,
  wherein, in the enumerating of each of the plurality of rule candidates, malware traces included in the analysis result of the malware are divided into a plurality of clusters based on a degree of similarity of the malware traces, and a regular expression of each of the plurality of rule candidates is generated with the different degrees of abstraction for each of the plurality of clusters.

4. The non-transitory computer-readable recording medium according to claim 3, wherein, in the calculating of the evaluation values and the sorting of the rule, a subset is sampled from a set of the plurality of rule candidates, the analysis result is referred to for the subset, an evaluation value is calculated based on any one or more of a detection rate, a false positive rate, a number of items of each of the rule candidates, a size of a rule set, and an overlapping rate of rules, and a rule is sorted based on the evaluation values.

5. The rule generation apparatus according to claim 1, wherein regular expressions for each of the plurality of rule candidates having a same length have the intermediate level of abstraction.

6. The rule generation apparatus according to claim 5, wherein regular expressions for each of the plurality of rule candidates having different lengths have the highest level of abstraction.

7. The rule generation apparatus according to claim 6, wherein regular expressions for each of the plurality of rule candidates having a same initial segment have the lowest level of abstraction.

8. The rule generation apparatus according to claim 7, wherein regular expressions for each of the plurality of rule candidates having the same initial segment and differing subsequent segments have the lowest level of abstraction.

9. The rule generation apparatus according to claim 8, wherein in the rule candidates having the same initial segment and differing subsequent segments, the initial segment and the differing subsequent segments are joined by an OR operator.

10. The non-transitory computer-readable recording medium according to claim 3, wherein regular expressions for each of the plurality of rule candidates having a same length have the intermediate level of abstraction.

11. The non-transitory computer-readable recording medium according to claim 10, wherein regular expressions for each of the plurality of rule candidates having different lengths have the highest level of abstraction.

12. The non-transitory computer-readable recording medium according to claim 11, wherein regular expressions for each of the plurality of rule candidates having a same initial segment have the lowest level of abstraction.

13. The non-transitory computer-readable recording medium according to claim 12, wherein regular expressions for each of the plurality rule candidates having the same initial segment and differing subsequent segments have the lowest level of abstraction.

14. The non-transitory computer-readable recording medium according to claim 13, wherein in the rule candidates having the same initial segment and differing subsequent segments, the initial segment and the differing subsequent segments are joined by an OR operator.

* * * * *